United States Patent
Ding (10) Patent No.: US 8,611,403 B1
(45) Date of Patent: Dec. 17, 2013

(54) APPARATUS AND METHODS FOR TRANSCEIVER POWER ADAPTATION

(75) Inventor: Weiqi Ding, Fremont, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/446,543

(22) Filed: Apr. 13, 2012

(51) Int. Cl.
*H04B 1/38* (2006.01)

(52) U.S. Cl.
USPC ........................................................ 375/219

(58) Field of Classification Search
USPC .......................................... 375/219, 231–233
See application file for complete search history.

(56) References Cited

U.S. PATENT DOCUMENTS

| | | | |
|---|---|---|---|
| 7,567,758 B2 * | 7/2009 | Aronson et al. | 398/135 |
| 7,792,187 B2 | 9/2010 | Bulzacchelli | |
| 2010/0086017 A1 * | 4/2010 | Shumarayev et al. | 375/232 |

OTHER PUBLICATIONS

ALTERA Application Note—Decision Feedback Equalization in Stratix IV Devices, Jan. 2011, pp. 1-10.

* cited by examiner

*Primary Examiner* — Leon-Viet Nguyen
(74) *Attorney, Agent, or Firm* — Okamoto & Benedicto LLP (57) ABSTRACT

Disclosed are apparatus and methods to advantageously manage transceiver power in an automated manner using adaptation logic that may be implemented on a same integrated circuit as the transceiver circuitry. In one embodiment, a power-consuming component of the transceiver is turned on at a lowest power setting. A determination is made as to whether a first set of eye opening data for a serial data signal meets preset criteria. If the preset criteria are not met by the first set of eye opening data, then the power-consuming component is changed to a second lowest power setting. Another embodiment relates to an integrated circuit including a receiver buffer, a receiver equalization circuit, an eye viewer circuit and adaptation logic. The adaptation logic is configured to obtain the eye opening data and to adapt the receiver equalization circuit to conserve power used. Other embodiments, aspects and features are also disclosed.

19 Claims, 7 Drawing Sheets

APPARATUS AND METHODS FOR TRANSCEIVER POWER ADAPTATION

BACKGROUND

1. Technical Field

The present invention relates generally to communication links including, but not limited to, serial interfaces for integrated circuits.

2. Description of the Background Art

High-speed communication links using serial interface protocols are used to communicate data between devices in a system. Examples of industry-standard protocols for high-speed input/output (HSIO) links include those related to PCI Express® (Peripheral Component Interconnect Express), XAUI (X Attachment Unit Interface), sRIO (serial Rapid IO), and many others.

The data rate requirements of such serial data links continue to increase as technology advances. In addition, larger numbers of transceivers may be needed in certain applications due to increases in bandwidth and throughput requirements. Unfortunately, as the data rate and the number of transceivers increase, the power consumption of the transceivers becomes of greater concern.

SUMMARY

The present disclosure provides apparatus and methods for transceiver power adaptation. The apparatus and methods advantageously manage transceiver power in an automated manner using adaptation logic that may be implemented on a same integrated circuit as the transceiver circuitry.

In one embodiment, a power-consuming component of the transceiver is turned on at a lowest power setting. A determination is made as to whether a first set of eye opening data for a serial data signal meets preset criteria. If the preset criteria are not met by the first set of eye opening data, then the power-consuming component is changed to a second lowest power setting.

In another embodiment, a first equalization stage is turned on at a lower-power setting while the remaining equalization stages are at a powered-down setting. A determination is made as to whether a first set of eye opening data for a serial data signal meets preset criteria. If the preset criteria are not met by the first set of eye opening data, then the first equalization stage is changed to a higher-power setting.

In another embodiment, a first tap of a decision feedback estimation (DFE) equalizer is turned on while the remaining taps of the DFE equalizer remain powered down. If a first set of post-DFE eye opening data does not meet post-DFE preset criteria, then a second tap of the DFE equalizer is turned on.

In another embodiment, a minimum differential output voltage is set at a transmitter driver. If a first set of returned eye opening data meets transmitter-based preset criteria, then the differential output voltage is increased.

Another embodiment relates to an integrated circuit including a receiver buffer, a receiver equalization circuit, an eye viewer circuit and adaptation logic. The adaptation logic is configured to obtain the eye opening data and to adapt the receiver equalization circuit to conserve power used.

Other embodiments, aspects, and features are also disclosed.

DETAILED DESCRIPTION

The present disclosure provides methods and apparatus which advantageously address problems relating to power consumption in transceiver circuits.

Figure 1:
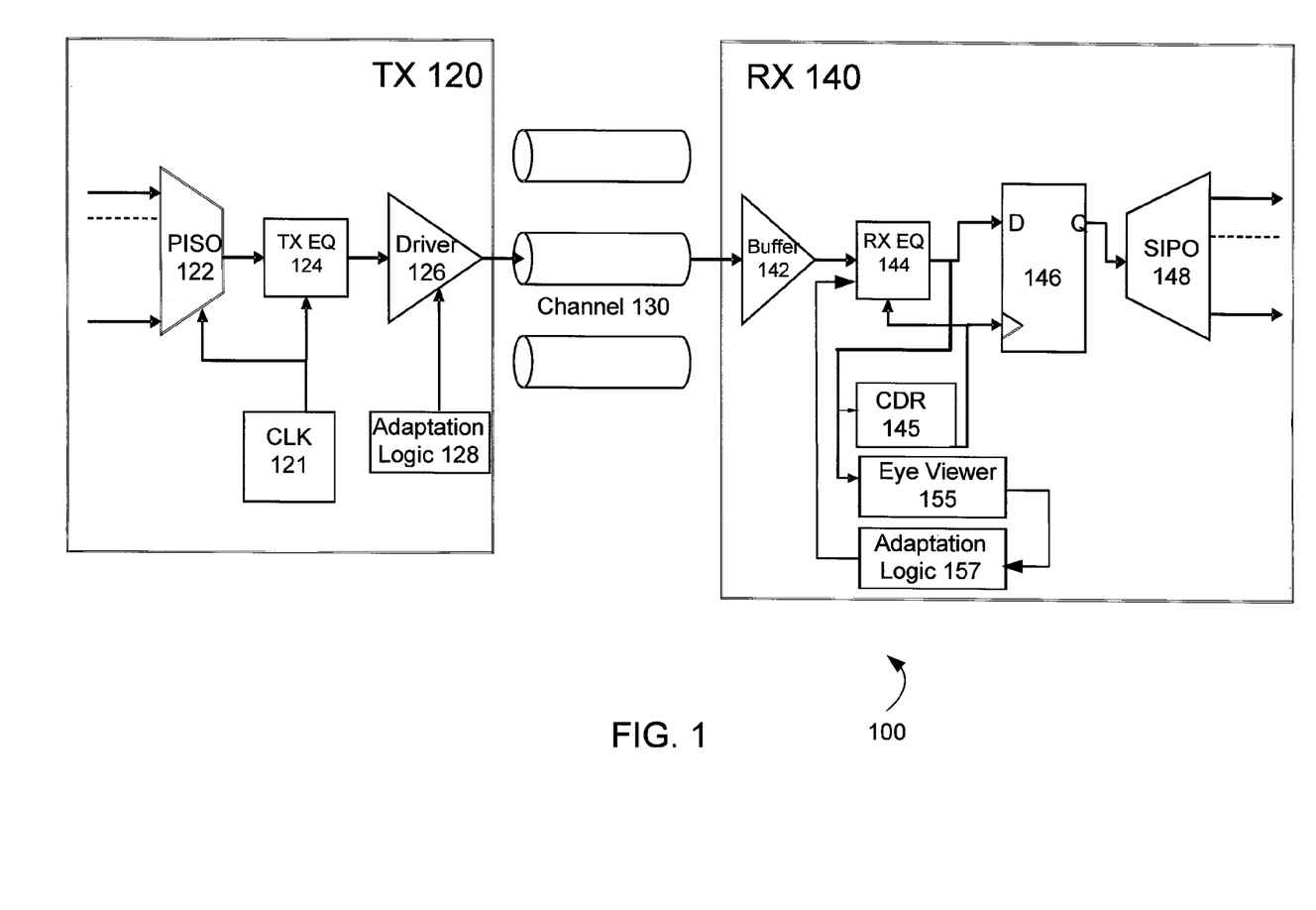
FIG. 1 is a high-level diagram of an exemplary communication link in accordance with an embodiment of the invention.

FIG. 1 is a high-level diagram of an exemplary communication link in accordance with an embodiment of the invention. As shown in FIG. 1, a communication link is generally composed of a transmitter (TX) 120, a receiver (RX) 140, and a communication channel (CH) 130 that is located in between the transmitter and the receiver.

The TX 120 may include a parallel-in-serial-out (PISO) circuit 122. The PISO (serializer) circuit 122 is configured to receive parallel data signals and convert it to a serial data signal. For example, the transmitter 120 may be part of an integrated circuit, and the parallel data signals may be provided by a communication protocol module in the integrated circuit.

The serial data signal may be adjusted by a transmitter equalizer (TX EQ) circuit 124. In one embodiment, the TX EQ circuit 124 may implement a finite impulse response (FIR) equalization that pre-distorts the transmitted signal to compensate for signal distortion in the channel 130. Clock generator (CLK) circuit 121 may utilize a phase locked loop circuit to provide a clock signal to the PISO 122 and TX EQ 124 circuits. The output from the TX EQ 124 circuit may be provided to a driver circuit 126. The driver circuit 126 may be arranged to transmit the serial data signal over the channel 130. As described further below, the adaptation logic 128 may be configured to adaptively set the differential output voltage (VOD) of the driver circuit 126.

The channel 130 communicates the serial data signal from the transmitter 120 to the receiver 140. The channel 130 may use multiple lanes to communicate the serial data signal.

The receiver 140 may be configured to receive the transmitted serial data signal from the multiple-lane channel into buffer circuitry 142. The buffer circuitry 142 may output the received serial data signal to receiver equalization (RX EQ) circuit 144.

As described further below, the RX EQ circuit 144 may be configured to perform one or more equalizations in a manner that adaptively conserves power. The equalizations may typically compensate for high-frequency signal loss in the channel. The RX EQ circuit 144 may output an "equalized" serial data signal to both a clock data recovery (CDR) circuit 145 and to a data input of a latch circuit 146.

The CDR circuit 145 may use a PLL to recover the clock signal from the serial data signal. The recovered clock signal may be provided to clock inputs of the RX EQ circuit 144 and to a latch circuit 146. In accordance with an embodiment of the invention, the recovered clock signal may also be provided to an eye viewer 155. The eye viewer 155 may be an on-chip signal quality monitoring circuit module.

In one embodiment, the eye viewer 155 may be arranged to provide multiple phase blocks (for example, 32 phase blocks) spanning a complete unit interval. The eye viewer 155 may block through the multiple phase blocks and monitor a bit error rate (BER) at each phase block so as to determine a horizontal size of the eye opening. Different voltage thresholds may be used in determining the BER so as to also determine a vertical size of the eye opening. One exemplary implementation of the eye viewer 155 may be an EyeQ viewer circuit module available on certain field programmable gate array (FPGA) products from Altera Corporation of San Jose, Calif.

The adaptation logic 157 may be hard-wired and/or programmed circuitry that is arranged to receive eye opening data from the eye viewer 155 and to use the eye opening data to determine whether an eye opening of the recovered clock signal meets a set of one or more preset criteria. Based on whether or not the criteria are met, the adaptation logic 157 may be further configured to send power-down and/or bypass signals to the RX EQ circuit 144. Exemplary methods performed by the adaptation logic 157 are described further below.

The latch circuit 146 may be configured to receive the "equalized" serial data signal from the RX EQ circuit 144 at its data input and to receive the recovered clock signal from the CDR circuit 145 at its clock input. The latch circuit 146 outputs the regenerated serial data signal to a serial-in-parallel-out (SIPO) circuit 148. The SIPO (serializer) circuit 148 is configured to receive a serial data signal and convert it to parallel data signals. The parallel data signals may be provided to other circuitry of the receiving device. For example, the receiving device may be an integrated circuit, and the parallel data signals may be provided to a communication protocol module in the integrated circuit.

Figure 2:
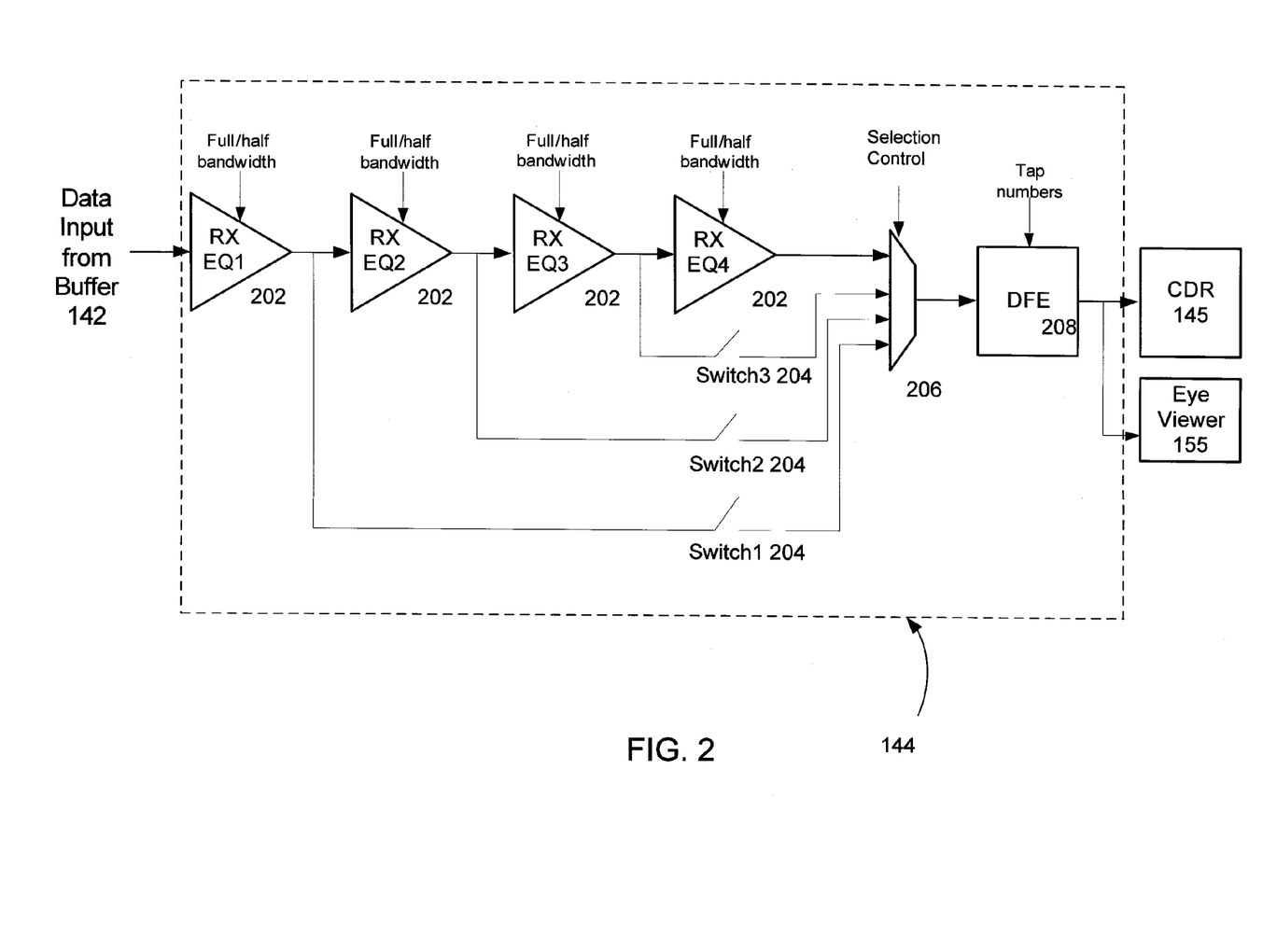
FIG. 2 shows an exemplary receiver equalization circuit in accordance with an embodiment of the invention.

FIG. 2 shows an exemplary receiver equalization (RX EQ) circuit 144 in accordance with an embodiment of the invention. As shown, the RX EQ circuit 144 may include a series of controllable equalization stages 202, bypass switches 204, bypass selector 206, and a controllable decision feedback estimation (DFE) equalizer 208.

The serial data signal from the RX buffer circuit 142 may be received by the series of controllable equalization stages 202. In the exemplary implementation shown, the series includes four controllable equalization stages 202 which are labeled RX EQ1, RX EQ2, RX EQ3, and RX EQ4. In other implementations, the series may include other numbers of controllable equalization stages. In accordance with an exemplary embodiment of the invention, each controllable equalization stage 202 may be implemented as a continuous-time linear estimation (CTLE) equalizer which is controllable to multiple settings (or modes).

In an exemplary embodiment, the controllable equalization stage 202 may be set to one of the following settings (or modes): a full-bandwidth setting, a half-bandwidth setting, and a powered-down setting. In the full-bandwidth setting, the controllable equalization stage 202 may be enabled to operate on (filter) its full frequency range. In the half-bandwidth setting, the controllable equalization stage 202 may be enabled to operate on (filter) a portion (for example, approximately half) its full frequency range. In the powered-down setting, the controllable equalization stage 202 may be powered down to conserve power. In the powered-down setting, no equalization is performed on the serial data signal by the controllable equalization stage 202.

In alternate embodiments, the controllable equalization stage 202 may have more than three settings. For example, instead of one half-bandwidth setting, the controllable equalization stage 202 may have multiple partial-bandwidth settings. For example, the controllable equalization stage 202 may have a full-bandwidth setting, a three-quarters-bandwidth setting, a half-bandwidth setting, a quarter-bandwidth setting, and a powered-down setting.

The bypass switches 204 may be arranged so as to controllably obtain the serial data signal at nodes between adjacent equalization stages 202 in the series. In the exemplary implementation shown, a first bypass switch (Switch1) 204 receives the output of the first controllable equalization stage (RX EQ1) 202, a second bypass switch (Switch2) 204 receives the output of the second controllable equalization stage (RX EQ2) 202, and a third bypass switch (Switch3) 204 receives the output of the third controllable equalization stage (RX EQ3) 202. If Switch1 204 is closed, then the output of RX EQ1 202 is provided to the multiplexer 206. If Switch2 204 is closed, then the output of RX EQ2 202 is provided to the multiplexer 206. If Switch3 204 is closed, then the output of RX EQ3 202 is provided to the selector 206.

The selector 206 may be controllable to select the output of one of the equalization stages 202 and provide it to the controllable DFE equalizer 208. In particular, as shown in the figure, the selector 206 may receive as inputs the output of each bypass switch (Switch1, Switch2, and Switch3 in the depicted exemplary implementation) 204 and the output of the last controllable equalization stage (RX EQ4 in the depicted exemplary implementation) 202. The selector 206 may be controlled to select one of these inputs to be output to the controllable DFE equalizer 208.

The controllable DFE equalizer 208 is a non-linear equalization circuit which uses feedback relating to the logic state of previously-transmitted data bits in order to decide the logic state of a present data bit. In accordance with an embodiment of the invention, unused taps within the controllable DFE equalizer 208 may be powered down based on input data that indicates the tap numbers to be powered down (or, alternatively, the tap numbers to be powered on). As shown, the controllable DFE equalizer 208 may be arranged to provide its output (the equalized serial data signal) to both the CDR circuit 145 and the eye viewer circuit 155.

Figure 3:
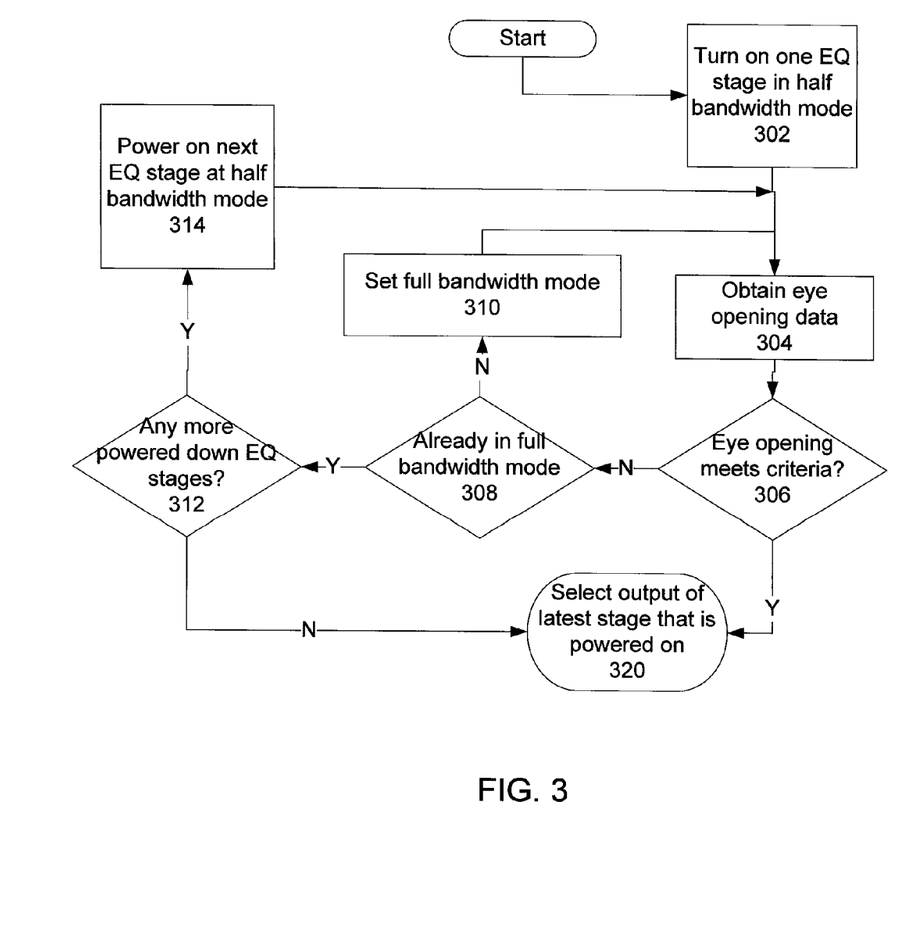
FIG. 3 is a flow chart of an exemplary method of power adaptation for a series of receiver equalization stages in accordance with an embodiment of the invention.

FIG. 3 is a flow chart of an exemplary method 300 of power adaptation for a series of receiver equalization stages in accordance with an embodiment of the invention. In one implementation, the method 300 may be performed to adapt the power usage of the series of equalization stages 202 in the receiver equalization circuit 200 shown in FIG. 2.

In an exemplary embodiment, the method 300 may be performed using the eye viewer 155 and the adaptation logic 157. The eye viewer 155 may receive the serial data signal (as currently equalized) and output eye opening data relating to that serial data signal. The adaptation logic 157 may receive the eye opening data and adapt the settings of the receiver equalization stages. The settings of the receiver equalization stages may be adapted to provide sufficient equalization while conserving power used.

Per block 302, the adaptation logic 157 may cause the first equalization (EQ) stage (the stage under consideration at this point) to be turned on and set to operate in a half-bandwidth mode. At this point in the method 300, the remaining EQ stages in the series and the DFE equalizer, if any, may remain powered down. In an exemplary embodiment, the first EQ stage may be the RX EQ1 stage 202, while the remaining EQ stages may be the subsequent stages 202 in the series (i.e., RX EQ2, RX EQ3, and RX EQ4).

Per block 304, a set of eye opening data may be obtained by the adaptation logic 157 from the eye viewer 155. The set of eye opening data indicates characteristics of a received serial data signal when the series of EQ stages is in its current state.

Per block 306, the adaptation logic 157 may determine whether or not the set of eye opening data meets one or more preset criteria. For example, the preset criteria may specify a minimum width and a minimum height for the eye opening.

If the preset criteria are met, then the current level of receiver equalization by the series of EQ stages appears to be sufficient. In that case, the adaptation logic 157 may proceed to block 320. Per block 320, the adaptation logic 157 may control the switches 204 and the selector 206 so that the output of the last EQ stage to be powered on (i.e. the stage under consideration) is output by the selector 206.

Otherwise, if one or more of the preset criteria are not met, then the method 300 continues to block 308. Per block 308, the adaptation logic 157 may make a determination as to whether or not the stage under consideration (i.e. the latest stage to be powered up) is already in full-bandwidth mode. If the stage under consideration is not already in full-bandwidth mode, then the stage under consideration is set to full-bandwidth mode per block 310. The method 300 then loops back and performs block 304.

Otherwise, if the stage under consideration is already in full-bandwidth mode, then the adaptation logic 157 may cause a next EQ stage in the series, if any, to be powered on and set to half-bandwidth mode per block 312. The newly powered-on stage becomes the stage under consideration. The method 300 then loops back and performs block 304.

If all the EQ stages in the series are powered on at full-bandwidth, then there are no more increases in power to be made for the EQ stages, so the adaptation logic 157 may proceed to block 320. In the case where all the EQ stages have been powered on, the adaptation logic 157 may control the selector 206 so that it selects the output of the last EQ stage in the series.

Figure 4:
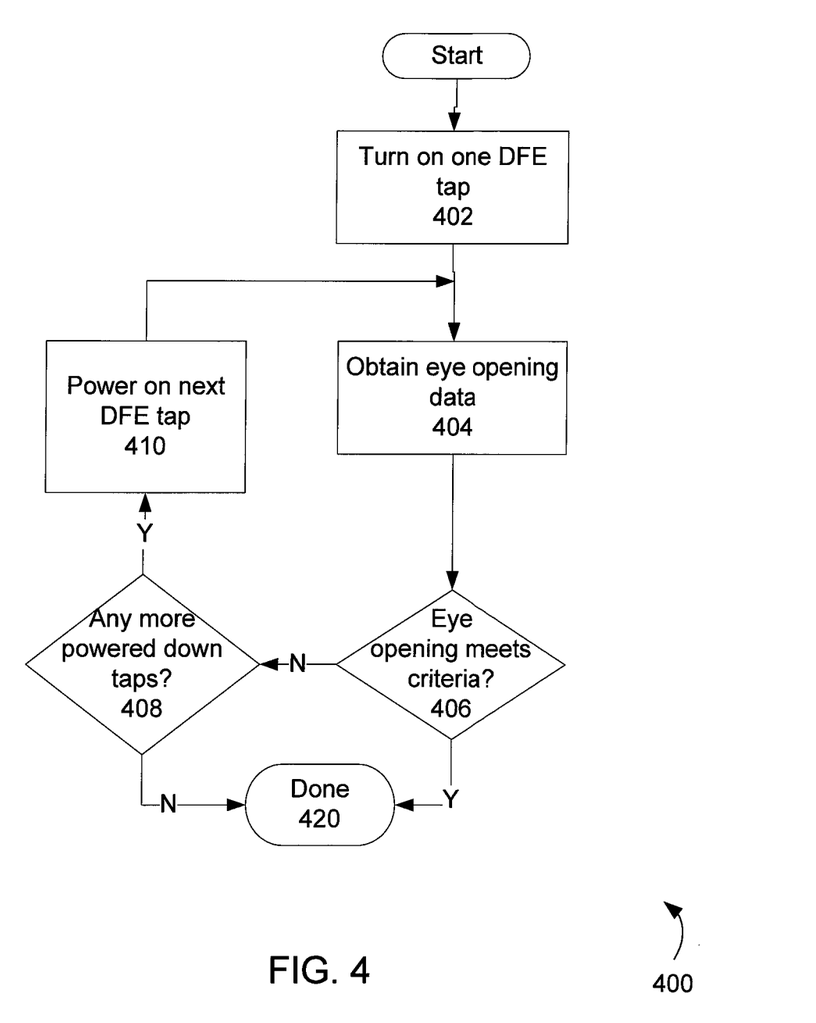
FIG. 4 is a flow chart of an exemplary method of power adaptation for decision feedback estimation equalizer in accordance with an embodiment of the invention.

FIG. 4 is a flow chart of an exemplary method 400 of power adaptation for decision feedback estimation (DFE) equalizer in accordance with an embodiment of the invention. In one implementation, the method 400 may be performed to adapt the power usage of the DFE equalizer 208 in the receiver equalization circuit 200 shown in FIG. 2. The method 400 of FIG. 4 may be performed in addition to the method 300 of FIG. 3, or the method 400 of FIG. 4 may be performed independently.

Per block 402, a first tap of the DFE equalizer 208 may be turned on by the adaptation logic 157. At this point in the method 400, the remaining taps in the DFE equalizer 208 remain powered down.

Per block 404, a set of eye opening data may be received by the adaptation logic 157 from the eye viewer 155. The set of eye opening data is post-DFE and indicates characteristics of a received serial data signal when the DFE equalizer 208 is in its current state.

Per block 406, the adaptation logic 157 may determine whether or not the set of post-DFE eye opening data meets one or more post-DFE preset criteria. For example, the post-DFE preset criteria may specify a minimum width and a minimum height for the eye opening. Note that the post-DFE preset criteria for adaptation of the DFE equalizer 208 may be different from the preset criteria for adaptation of the series of EQ stages.

If the post-DFE preset criteria are met, then the current level of receiver equalization by the DFE equalizer 208 appears to be sufficient. In that case, the adaptation logic 157 may deem the adaptation of the DFE equalizer 208 to be done per block 420.

Otherwise, if one or more of the post-DFE preset criteria are not met, then the method 300 continues to block 408. Per block 408, the adaptation logic 157 may make a determination as to whether or not there are any further DFE taps to power on. If there is another tap to power on, then the adaptation logic 157 causes a next DFE tap to be powered on per block 410. The method 400 then loops back and performs block 404. If there are no other DFE taps to power on, then the adaptation logic 157 may deem the adaptation of the DFE equalizer 208 to be done per block 420.

Figure 5:
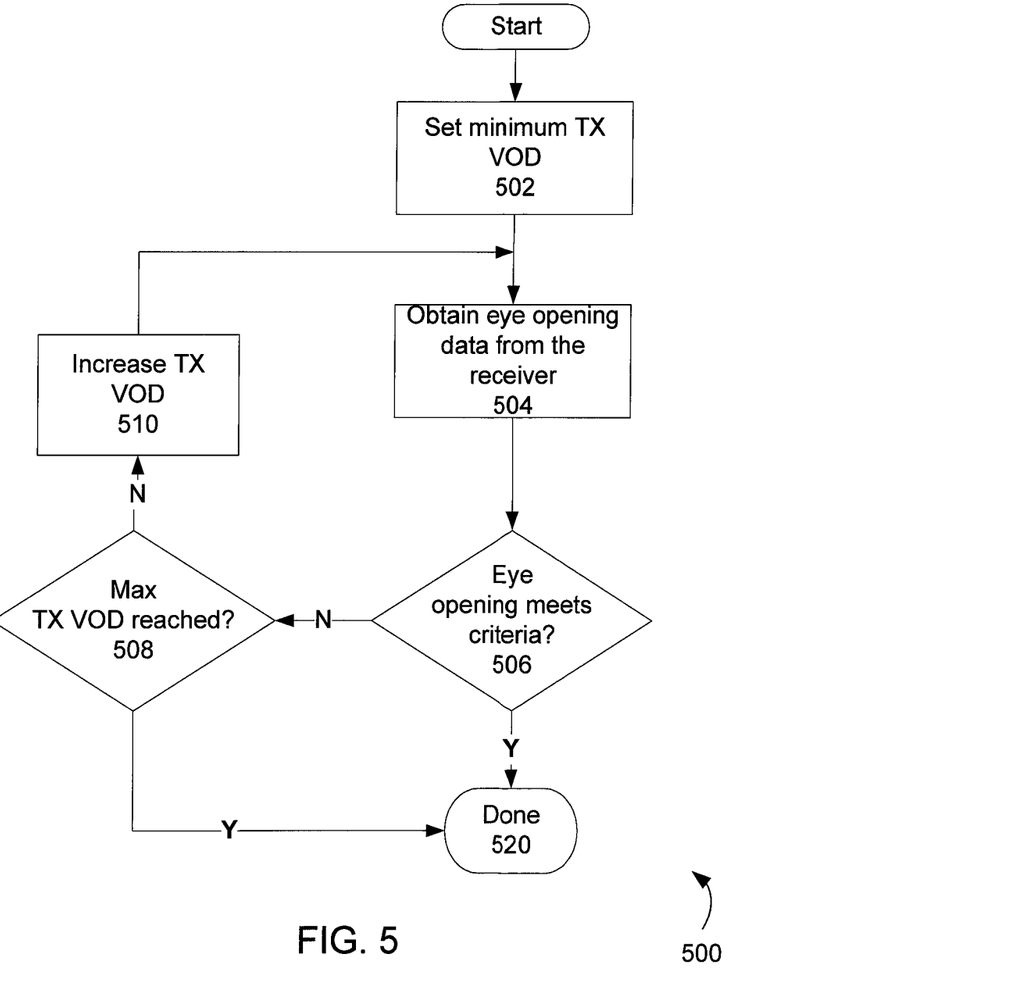
FIG. 5 is a flow chart of an exemplary method of power adaptation at a transmitter circuit in accordance with an embodiment of the invention.

FIG. 5 is a flow chart of an exemplary method 500 of power adaptation at a transmitter in accordance with an embodiment of the invention. The method 500 may be performed under control of the adaptation logic 128 at the transmitter 120. This transmitter power adaptation method 500 may be performed in conjunction with one or both of the above-described receiver power adaptation methods (300 and 400).

Per block 502, a differential output voltage at a transmitter (TX VOD) may be set at a minimum (initial) level. Generally, a lower TX VOD conserves power relative to a higher TX VOD.

Per block 504, a set of returned eye opening data may be received from a receiver. The set of returned eye opening data indicates characteristics of the received serial data when the TX VOD is at the currently set level. The set of returned eye opening data may be obtained by an eye viewer 155 at the receiver 140 and transmitted back to the adaptation logic 128 at the transmitter 120 by a reverse communication link. For example, the devices at both ends of the channel 130 may be transceivers that have both a transmitter and a receiver, such that the communication link between them goes both ways.

Per block 506, a determination may then be made as to whether or not the set of returned eye opening data meets one or more transmitter-based preset criteria. For example, the transmitter-based preset criteria may specify a minimum width and a minimum height for the eye opening. Note that the transmitter-based preset criteria for adaptation at the transmitter may be different from the preset criteria for adaptation at the receiver.

If the transmitter-based preset criteria are met, then the current level of the TX VOD appears to be sufficient. In that case, the adaptation of the transmitter may be deemed to be done per block 520.

Otherwise, if one or more of the transmitter-based preset criteria are not met, then the method 500 continues to block 508. Per block 508, a determination may be made as to whether or not the maximum TX VOD has been reached. If not, then TX VOD may be increased to a next level per block 510, and the method 500 then loops back and performs block 504. If the maximum TX VOD has been reached, then the adaptation of the transmitter may be deemed to be done per block 520.

Figure 6:
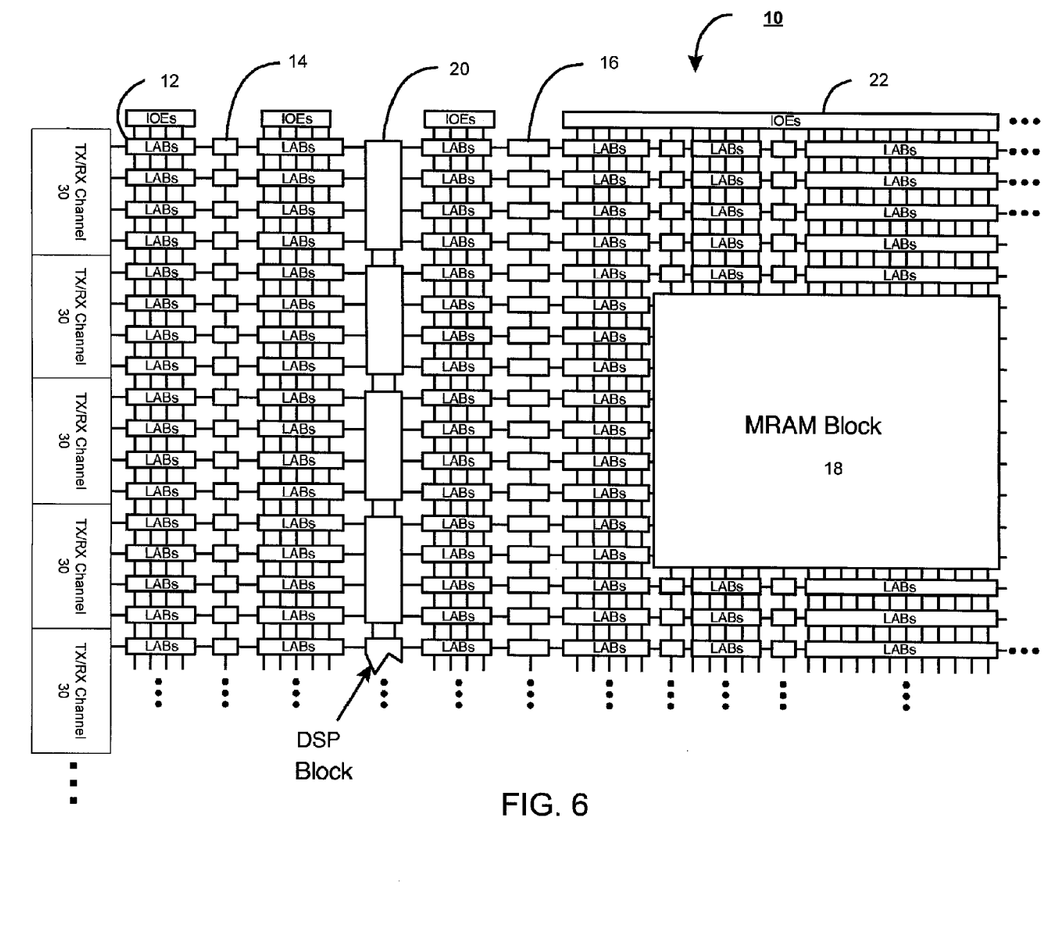
FIG. 6 is a simplified partial block diagram of an exemplary field programmable gate array that may be configured to implement an embodiment of the present invention.

FIG. 6 is a simplified partial block diagram of an exemplary field programmable gate array (FPGA) 10 that may be configured to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs). FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs). A LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10. A transceiver (TX/RX) channel array may be arranged as shown, for example, with each TX/RX channel circuit 30 being coupled to several LABs. A TX/RX channel circuit 30 may include, among other circuitry, transmitter and/or receiver circuitry as described herein.

It is to be understood that FPGA 10 is described herein for illustrative purposes only and that the present invention can be implemented in many different types of PLDs, FPGAs, and ASICs.

Figure 7:
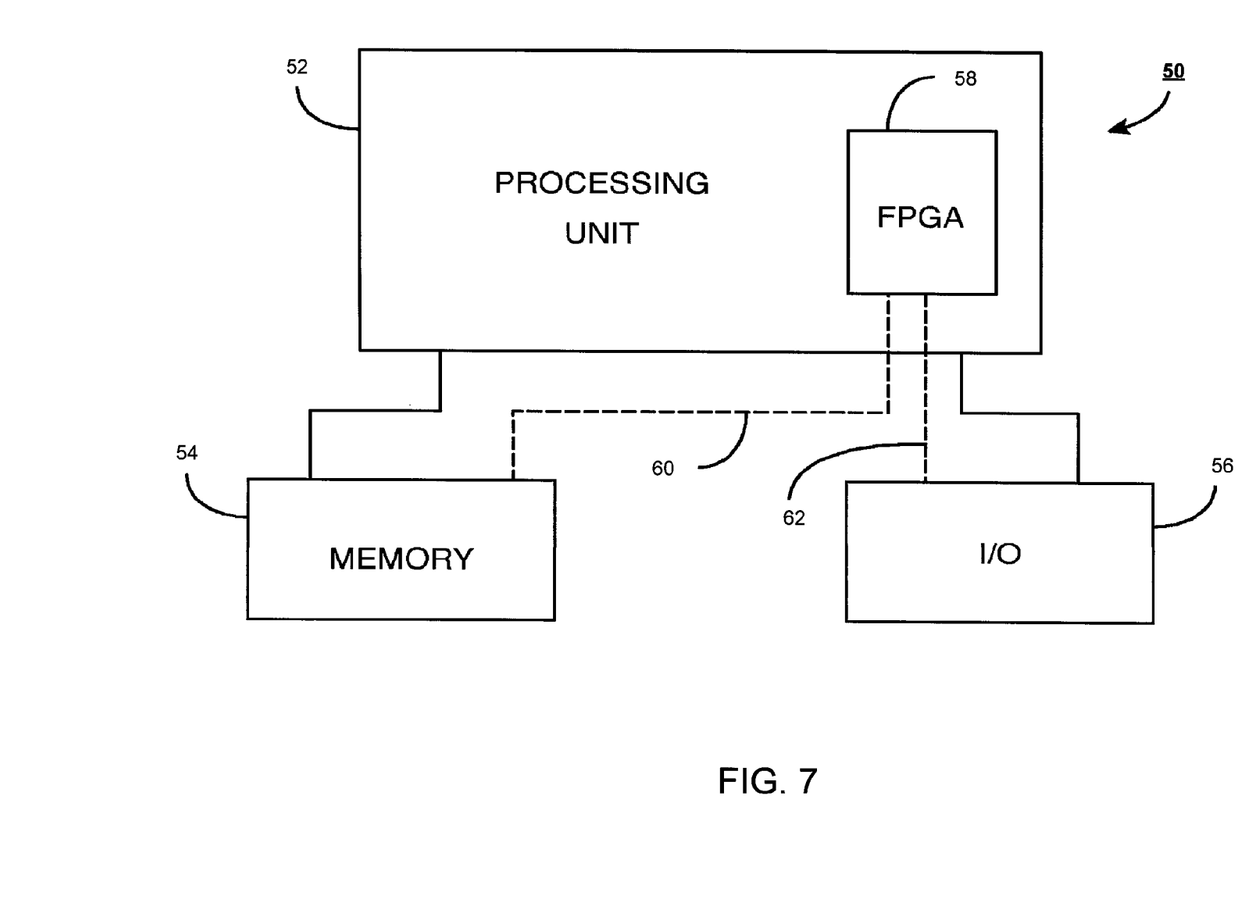
FIG. 7 shows a block diagram of an exemplary digital system that may employ PDN noise reduction techniques as disclosed herein.

FIG. 7 shows a block diagram of an exemplary digital system 50 that may employ techniques disclosed herein. System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 is programmed to implement the logical functions necessary to carry on its particular role in system operation. FPGA 58 can be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. An integrated circuit comprising:
   a receiver buffer for receiving a serial data signal;
   a receiver equalization circuit which is configured to equalize the serial data signal;
   an eye viewer circuit which is configured to process the serial data signal to generate eye opening data; and
   adaptation logic which is configured to obtain the eye opening data and to adapt the receiver equalization circuit to conserve power used,
   wherein the adaptation logic is configured to turn on a first equalization stage of a plurality of equalization stages at a lower-power setting while remaining equalization stages of the plurality of equalization stages are set to a powered-down setting, obtain a first set of eye opening data for a serial data signal, determine if the first set of eye opening data meets preset criteria, and set the first equalization stage to a higher-power setting if the preset criteria are not met by the first set of eye opening data.

2. An integrated circuit comprising:
   a receiver buffer for receiving a serial data signal;
   a receiver equalization circuit which is configured to equalize the serial data signal;
   an eye viewer circuit which is configured to process the serial data signal to generate eye opening data; and
   adaptation logic which is configured to obtain the eye opening data and to adapt the receiver equalization circuit to conserve power used,
   wherein the adaptation logic is further configured to turn on a first tap of a plurality of taps of a decision feedback estimation (DFE) equalizer while remaining taps of the plurality of taps are set to a powered-down setting, obtain a first set of post-DFE eye opening data for a serial data signal, determine if the first set of post-DFE eye opening data meets post-DFE preset criteria, and turn on a second tap of the plurality of taps of the decision feedback estimation if the post-DFE preset criteria are not met by the first set of post-DFE eye opening data.

3. An integrated circuit comprising:
   a receiver buffer for receiving a serial data signal;
   a receiver equalization circuit which is configured to equalize the serial data signal;
   an eye viewer circuit which is configured to process the serial data signal to generate eye opening data;

adaptation logic which is configured to obtain the eye opening data and to adapt the receiver equalization circuit to conserve power used; and a transmitter driver for driving a serial data signal, wherein the adaptation logic is further configured to set a minimum differential output voltage at the transmitter driver, receive a first set of returned eye opening data for the serial data signal, determine if the first set of returned eye opening data meets transmitter-based preset criteria, and increase the differential output voltage if the transmitter-based preset criteria are not met by the first set of returned eye opening data.

4. A method for transceiver power adaptation, the method comprising:

setting a power-consuming component of the transceiver to a first setting that is a lowest power-consuming setting;

obtaining a first set of eye opening data for a serial data signal;

determining if the first set of eye opening data meets preset criteria; and setting the power-consuming component to a second lowest power setting if the preset criteria are not met by the first set of eye opening data, wherein the power-consuming component comprises an equalizer which includes a plurality of equalizer stages, the lowest power setting comprises setting a first equalization stage of a plurality of equalization stages at a lower-power setting while remaining equalization stages of the plurality of equalization stages are set to a powered-down setting, and the second lowest power setting comprises setting the first equalization stage at a higher-power setting while the remaining equalization stages are set to a powered-down setting.

5. The method of claim 4, wherein the lower-power setting comprises a half-bandwidth setting and the higher-power setting comprises a full-bandwidth setting.

6. The method of claim 4, further comprising:

obtaining a second set of eye opening data for the serial data signal;

determining if the second set of eye opening data meets the preset criteria; and turning on a second equalization stage of the plurality of equalization stages at a lower-power setting if the preset criteria are not met by the second set of eye opening data.

7. The method of claim 6, further comprising:

obtaining a third set of eye opening data for the serial data signal;

determining if the third set of eye opening data meets preset criteria; and setting the second equalization stage at a higher-power setting if the preset criteria are not met by the third set of eye opening data.

8. The method of claim 7, further comprising:

obtaining a fourth set of eye opening data for the serial data signal;

determining if the fourth set of eye opening data meets the preset criteria; and turning on a third equalization stage of the plurality of equalization stages at a lower-power setting if the preset criteria are not met by the fourth set of eye opening data.

9. The method of claim 6, further comprising:

selecting an output of a latest equalization stage that was powered on.

10. The method of claim 9, further comprising:

turning on a first tap of a plurality of taps of a decision feedback estimation (DFE) equalizer while remaining taps of the plurality of taps are set to a powered-down setting;

obtaining a first set of post-DFE eye opening data for the serial data signal;

determining if the first set of post-DFE eye opening data meets post-DFE preset criteria; and turning on a second tap of the plurality of taps if the post-DFE preset criteria are not met by the first set of post-DFE eye opening data.

11. The method of claim 10, further comprising:

obtaining a second set of post-DFE eye opening data for the serial data signal;

determining if the second set of post-DFE eye opening data meets post-DFE preset criteria; and turning on a third tap of the plurality of taps if the post-DFE preset criteria are not met by the second set of post-DFE eye opening data.

12. The method of claim 11, further comprising:

setting a minimum differential output voltage at a transmitter;

receiving a first set of returned eye opening data for the serial data signal;

determining if the first set of returned eye opening data meets transmitter-based preset criteria; and increasing the differential output voltage if the transmitter-based preset criteria are not met by the first set of returned eye opening data.

13. The method of claim 12, further comprising:

receiving a second set of returned eye opening data for the serial data signal;

determining if the second set of returned eye opening data meets the transmitter-based preset criteria; and further increasing the differential output voltage if the transmitter-based preset criteria are not met by the second set of returned eye opening data.

14. A method for transceiver power adaptation, the method comprising:

setting a power-consuming component of the transceiver to a first setting that is a lowest power-consuming setting;

obtaining a first set of eye opening data for a serial data signal;

determining if the first set of eve opening data meets preset criteria; and setting the power-consuming component to a second lowest power setting if the preset criteria are not met by the first set of eye opening data, wherein the power-consuming component comprises a decision feedback estimation (DFE) equalizer, the lowest power setting comprises setting a first tap of a plurality of taps to a powered-on setting while remaining taps of the plurality of taps are set to a powered-down setting, and the second lowest power setting comprises setting the first and second taps at a higher-power setting while the remaining taps are set to a powered-down setting.

15. The method of claim 14, further comprising:

obtaining a second set of post-DFE eye opening data for the serial data signal;

determining if the second set of post-DFE eye opening data meets the post-DFE preset criteria; and turning on a third tap of the plurality of taps if the post-DFE preset criteria are not met by the second set of post-DFE eye opening data.

16. The method of claim 15, wherein the method is performed after power adaptation is completed for a series of equalization stages which process the serial data signal before the DFE equalizer.

17. A method for transceiver power adaptation, the method comprising:
- setting a power-consuming component of the transceiver to a first setting that is a lowest power-consuming setting;
- obtaining a first set of eye opening data for a serial data signal;
- determining if the first set of eye opening data meets preset criteria; and
- setting the power-consuming component to a second lowest power setting if the preset criteria are not met by the first set of eye opening data, wherein the power-consuming component comprises a transmitter driver, the lowest power setting comprises setting a differential output voltage at the transmitter driver to a lowest level, and the second lowest power setting comprises setting the differential output driver voltage at the transmitter driver to a second lowest level.

18. The method of claim 17, further comprising:
receiving a second set of returned eye opening data for the serial data signal;
determining if the second set of returned eye opening data meets the transmitter-based preset criteria; and
increasing the differential output voltage to a next higher level if the transmitter-based preset criteria are not met by the second set of returned eye opening data.

19. The method of claim 18, wherein the method is performed after power adaptation is completed at a receiver.

* * * * *